(12) United States Patent
Ried et al.

(10) Patent No.: US 10,135,367 B2
(45) Date of Patent: Nov. 20, 2018

(54) INTEGRATED SOFT START AND SAFETY SHUTDOWN

(71) Applicant: Woodward, Inc., Fort Collins, CO (US)

(72) Inventors: David L. Ried, Severance, CO (US); Dustin Kramer, Fort Collins, CO (US); Dan Gotko, Severance, CO (US); Charles M. Brunswig, Fort Collins, CO (US); Greg Opper, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 17 days.

(21) Appl. No.: 14/107,811

(22) Filed: Dec. 16, 2013

(65) Prior Publication Data
US 2015/0171625 A1 Jun. 18, 2015

(51) Int. Cl.
| | | |
|---|---|---|
| *H02M 3/335* | (2006.01) | |
| *H02P 6/34* | (2016.01) | |
| *H02H 3/087* | (2006.01) | |
| *B25J 9/16* | (2006.01) | |
| *H02P 1/00* | (2006.01) | |
| *H02H 7/122* | (2006.01) | |
| *H02H 7/08* | (2006.01) | |

(Continued)

(52) U.S. Cl.
CPC ............... *H02P 1/00* (2013.01); *H02H 7/08* (2013.01); *H02H 7/122* (2013.01); *H02H 9/002* (2013.01); *H02P 29/032* (2016.02)

(58) Field of Classification Search
CPC ....... H02M 3/33507; H02P 6/142; B25J 9/16; H02H 3/087

USPC .......................... 417/44.1; 318/430; 307/126
See application file for complete search history.

(56) References Cited

U.S. PATENT DOCUMENTS

| | | | |
|---|---|---|---|
| 4,384,243 A | * | 5/1983 | Muskovac ............ H02J 3/1892 318/729 |
| 4,910,447 A | | 3/1990 | Masters |

(Continued)

FOREIGN PATENT DOCUMENTS

| | | |
|---|---|---|
| CN | 2845308 | 12/2006 |
| CN | 101626215 | 1/2010 |
| CN | 201422090 | 3/2010 |

OTHER PUBLICATIONS

Chinese First Office Action in Chinese Application No. 201480075013.3, dated Mar. 12, 2018, 21 pages.

(Continued)

*Primary Examiner* — Bentsu Ro
*Assistant Examiner* — Cortez Cook
(74) *Attorney, Agent, or Firm* — Fish & Richardson P.C.

(57) ABSTRACT

The subject matter of this specification can be embodied in, among other things, a current control assembly that includes an electrical current flow path having a maximum current flow rate, a first current limiter in the electrical current flow path, the first current limiter comprising circuitry configured to adjustably restrict current flow along the electrical current flow path to a flow rate less than the maximum current flow rate in response to receipt of a first signal at a first input port, and a second current limiter in the electrical current flow path, the second current limiter arranged to interrupt the electrical current flow path in response to receipt of a second signal at a second input port.

15 Claims, 2 Drawing Sheets

(51) Int. Cl.
   *H02H 9/00* (2006.01)
   *H02P 29/032* (2016.01)

(56) References Cited

U.S. PATENT DOCUMENTS

| | | | | |
|---|---|---|---|---|
| 5,668,457 | A * | 9/1997 | Motamed | F04B 49/065 |
| | | | | 318/606 |
| 5,944,635 | A | 8/1999 | Butler | |
| 5,969,957 | A * | 10/1999 | Divan | H02M 5/458 |
| | | | | 318/768 |
| 6,997,684 | B2 * | 2/2006 | Hahn et al. | 417/44.1 |
| 2003/0165072 | A1 * | 9/2003 | Nadd | H02M 7/003 |
| | | | | 363/147 |
| 2003/0175124 | A1 * | 9/2003 | Hahn | H02P 6/085 |
| | | | | 417/44.1 |
| 2011/0148323 | A1 * | 6/2011 | Yao | H05B 33/0827 |
| | | | | 315/295 |
| 2011/0163730 | A1 * | 7/2011 | Zhang | H02M 3/158 |
| | | | | 323/234 |
| 2011/0227520 | A1 * | 9/2011 | Kitagawa | H02P 6/142 |
| | | | | 318/400.14 |
| 2011/0227522 | A1 * | 9/2011 | Shinomoto | H02M 1/4225 |
| | | | | 318/400.29 |
| 2012/0293017 | A1 * | 11/2012 | Lidsky | H02H 3/087 |
| | | | | 307/126 |

OTHER PUBLICATIONS

Exida, "IEC 61508 Overview Report", Version 2.0, Jan. 2, 2006, 29 pages.
Mitter, "Active Inrush Current Limiting Using MOSFETs", AN1542, Copyright 1995, 14 pages.
Ramirez, "Diverse Redundancy used in SIS Technology to Achieve Higher Safety Integrity", May 8, 2008, 9 pages.
Timms, "IEC 61508—Is it pain or gain?", Measurement & Control, Jul. 2002, 6 pages.
International Search Report and Written Opinion of the International Searching Authority issued in International Application No. PCT/US2014/069956 dated Mar. 12, 2015; 10 pages.
PCT International Preliminary Report on Patentability, PCT/US2014/069956, dated Jun. 30, 2016, 8 pages.

* cited by examiner

INTEGRATED SOFT START AND SAFETY SHUTDOWN

TECHNICAL FIELD

This instant specification relates to electrical devices for limiting inrush currents and for providing safety shutdown functionality.

BACKGROUND

Electrical motors are used in a wide variety of commercial and industrial settings. Because of their varied use, electrical motors and associated motor control devices often operate in situations where their operations are critical for safety and/or system operation reasons. Electrical motors in such environments are commonly used to drive and/or position mechanical devices.

Electrical motors may be used in a wide variety of applications, including use with valve positioners and the like. During startup, alternating current electrical motors may momentarily draw current flows that are several times their normal operational currents. Electric motors are often coupled to capacitive voltage reserves to provide additional current flows during startup, but these capacitors can also draw large amounts of current while charging to their rated capacities.

During operation of a system including motor, unsafe operating conditions may arise, such as a temperature or pressure exceeding safe operating limits. In such instances, it may be desirable to shut down the motor, which typically includes transitioning the electric motor into a safe state and removing power from the electrical components.

SUMMARY

In general, this document electrical devices for limiting inrush currents and for providing safety shutdown functionality.

In a first aspect, a current control assembly includes an electrical current flow path having a maximum current flow rate, a first current limiter in the electrical current flow path, the first current limiter comprising circuitry configured to adjustably restrict current flow along the electrical current flow path to a flow rate less than the maximum current flow rate in response to receipt of a first signal at a first input port, and a second current limiter in the electrical current flow path, the second current limiter arranged to interrupt the electrical current flow path in response to receipt of a second signal at a second input port.

Various implementations can includes some, all, or none of the following features. The first current limiter can be further configured to, in response to a first state of the first signal, interrupt current flow along the current flow path, and in response to a second state of the first signal begin a soft start time period, restrict flow along the current flow path to a restricted rate greater than zero current flow and less than the maximum current flow rate for the duration of the soft start time period, and permit current flow along the current flow path at an unrestricted rate upon expiration of the soft start time. The first current limiter can be further configured to, in response to a first state of the first signal, interrupt current flow along the current flow path, and in response to a second state of the first signal begin a soft start time period having a start time and an end time, restrict current flow along the current flow path to a variable restricted flow rate ranging from about zero current flow at the start time to an unrestricted rate at the end time. The second signal can be the first signal. At least one of the first current limiter and the second current limiter can include a current limiting component in the current flow path and can be selected from one of a field effect transistor, an insulated gate bipolar transistor, or a relay. The first current limiter can be a field effect transistor and the second current limiter can be a field effect transistor.

In a second aspect, a motor control system with a soft-start capability includes an electrical current flow path having a maximum current flow rate, an electrical input configured to connect an input voltage to the electrical current flow path, a voltage storage assembly in the current flow path, a current control assembly in the electrical current flow path. The current control assembly includes a first current limiter in the electrical current flow path, the first current limiter comprising circuitry configured to adjustably restrict current flow along the electrical current flow path to a flow rate less than the maximum current flow rate in response to receipt of a first signal at a first input port, and a second current limiter in the electrical current flow path, the second current limiter arranged interrupt the electrical current flow path in to receipt of a second signal at a second input port, a motor controller arranged to receive electrical power from the voltage storage assembly, and a motor configured to be controlled by the motor controller.

Various implementations can include some, all, or none of the following features. The first current limiter can be further configured to, in response to a first state of the first signal, interrupt current flow along the current flow path, and in response to a second state of the first signal begin a soft start time period, restrict flow along the current flow path to a restricted rate greater than zero current flow and less than the maximum current flow rate for the duration of the soft start time period, and permit current flow along the current flow path at an unrestricted rate upon expiration of the soft start time. The first current limiter can be further configured to, in response to a first state of the first signal, interrupt current flow along the current flow path, and in response to a second state of the first signal begin a soft start time period having a start time and an end time, restrict current flow along the current flow path to a variable restricted flow rate ranging from about zero current flow at the start time to an unrestricted rate at the end time. The second signal can be the first signal. At least one of the first current limiter and the second current limiter can be a current limiting component in the current flow path and can be selected from one of a field effect transistor, an insulated gate bipolar transistor, or a relay. The first current limiter can be a field effect transistor and the second current limiter can be a field effect transistor.

In a third aspect, a method for soft-starting an electrical current-consuming apparatus includes providing a motor control system. The motor control system includes a current control assembly in an electrical current flow path, the current control assembly including a first current limiter in the electrical current flow path, the first current limiter comprising circuitry configured to adjustably restrict current flow along the electrical current flow path between an electrical input and a voltage storage assembly, and a first input port, and a second current limiter in the electrical current flow path, the second current limiter arranged to interrupt the electrical current flow path, and a second input port. The method also includes resisting, by the first current limiter and the second current limiter, current flow in the current flow path, receiving a first signal at the first input port, receiving a second signal at the second input port, permitting, by the second current limiter in response to the second signal, current flow in the current flow path, and adjustably restricting, by the first current limiter in response to the first signal, current flow along the electrical current flow path.

Various implementations can include some, all, or none of the following features. The method can also include interrupting, in response to a first state of the first signal, current flow along the current flow path, beginning, in response to a second state of the first signal, a soft start time period, restricting, for the duration of the soft start time period, flow along the current flow path to a restricted rate greater than zero current flow and less than the maximum current flow rate, and permitting, upon expiration of the soft start time, current flow along the current flow path at an unrestricted rate. The method can also include interrupting, in response to a first state of the first signal, current flow along the current flow path, beginning, in response to a second state of the first signal, a soft start time period having a start time and an end time, restricting, at the start time, current flow along the current flow path to about zero current flow, and increasing, during the soft start period, current flow along the current flow path from about zero current flow to an unrestricted rate at the end time. The second signal can be the first signal. At least one of the first current limiter and the second current limiter can be a current limiting component in the current flow path and can be selected from one of a field effect transistor, an insulated gate bipolar transistor, or a relay. The first current limiter can be a field effect transistor and the second current limiter can be a field effect transistor.

The systems and techniques described here may provide one or more of the following advantages. First, a system can provide soft start and safety shutdown functions in a reduced size. Second, the system can provide soft start and safety shutdown functions with a reduced cost. Third, the system can provide soft start and safety shutdown functions using fewer components, providing an associated improvement in reliability. Fourth, the system can provide a simplified implementation of a high availability safety shutdown.

The details of one or more implementations are set forth in the accompanying drawings and the description below. Other features and advantages will be apparent from the description and drawings, and from the claims.

DETAILED DESCRIPTION

This document describes systems and techniques for providing an integrated electrical soft-start and safety interrupt apparatus. In general, soft start, or inrush current limiting, is a desirable feature for use with electric motor drives or other electrical loads. On initial application of power, internal energy storage capacitors can draw a very high level of inrush or surge current. Without soft-start functionality, the power distribution systems providing power to such motors would generally be sized to handle the inrush of a single or sometimes multiple devices at the same time. Inrush currents can also place stress upon motor drive power components. Generally speaking, soft start or inrush limiter circuits limit the initial current until the capacitors are charged.

Another feature that is becoming more commonly required in industrial applications is a certified safety shutdown mechanism according to a functional safety standard such as S+ IEC 61508 edition 2.0 Commented version (2010-04), "Functional safety of electrical/electronic/programmable electronic safety-related systems," published by the International Electrotechnical Commission. In general, a safety shutdown function apparatus responds to an external trip signal by removing power to the motor or other load, and allowing an actuator to close under another source of energy, such as a spring. Functional safety standards, such as the aforementioned IEC 61508 standard, require that the safety function (shutdown) have proven independence from the rest of the circuitry. In some implementations, such a requirement may be in place so the safety function has very high availability in the presence of other possible failures.

Figure 1:
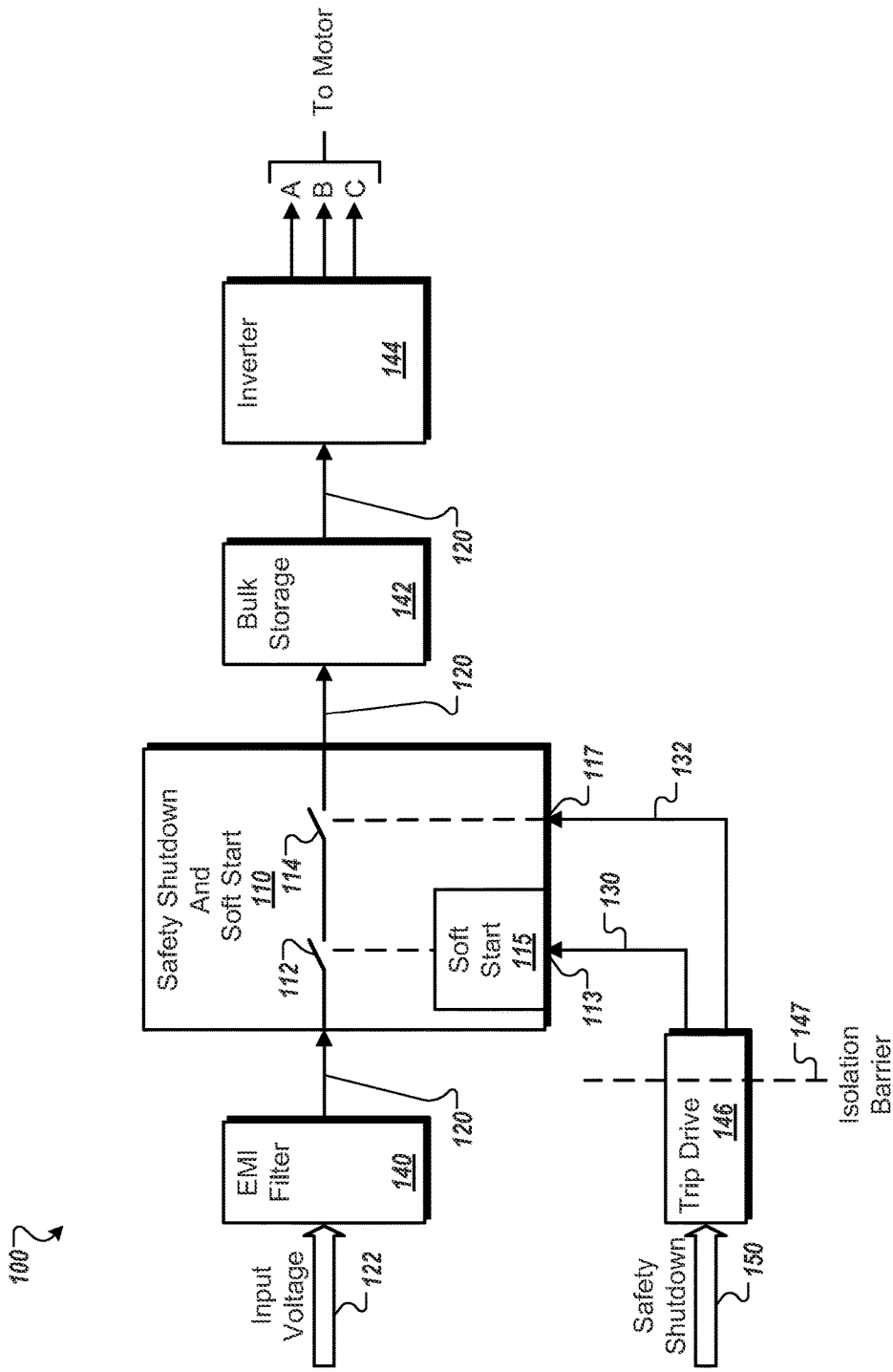
FIG. 1 is a schematic diagram that shows an example of a system with an integrated safety shutdown and soft-start module.

FIG. 1 is a schematic diagram that shows an example of a system 100 with an example integrated safety shutdown and soft-start module 110. In general, the module 110 integrates soft-start and safety shutdown functions, which in previous applications are implemented as separate circuits, into a single apparatus that can provide both a soft-start and a safety shutdown feature.

The module 110 includes a current limiter 112 in a current path 120. The current limiter 112 adjustably limits current flow in response to an input signal 130 provided to an input port 113 of a soft-start module 115. The soft start module 115 includes electrical circuitry that controls the amount of current limiting provided by the current limiter 112. When the input signal 130 is in a first state, e.g., "on", the soft start module 115 adjusts the current limiting of the current limiter 112 to a soft start flow that is greater than zero flow and less than a substantially unrestricted flow. When the input signal 130 is in a second state, e.g., "off", the soft start module 115 adjusts the current limiting of the current limiter 112 to substantially stop current flow along the current path 120.

In some embodiments, the soft start module 115 can also include timing circuitry, and the soft start module 115 can control the current limiter 112 to allow the soft start flow for a soft start time period that starts when the first state of the input signal is received, and adjusts the current limiter 112 to permit a substantially unrestricted flow after the soft start time period expires. In some embodiments, the soft start module 115 can be passive electronic circuitry. For example, the soft start module 115 can be an RL, RC, or RLC circuit, the components of which are selected to provide a predetermined timing and control behavior to the current limiter 122.

The module 110 includes a current limiter 114 in the current path 120. The current limiter 114 is configured to controllably interrupt current flow in response to an input signal 132 provided to an input port 117. In some implementations, the current limiter 114 can be a relay or other form of switch device. When the input signal 132 is in a first state, e.g., "on", the current limiter 114 permits a substantially unrestricted flow along the current path 120. When the input signal 132 is in a second state, e.g., "off", the current limiter 114 substantially stops, or completely stops, current flow along the current path 120.

In some embodiments, the current limiter 112 and/or the current limiter 114 can be electromechanical switches, relays, transistors, insulated gate bipolar transistors (IGBT), field effect transistors (FET), metal-oxide FETs (MOSFET), or combinations of these and/or other appropriate mechanical, electrical, or electromechanical current limiting devices. In some embodiments, the current limiter 112 and the current limiter 114 can implement the same type of current limiting devices.

In operation, input voltage 122 in the implementation shown in FIG. 1 is provided to an electromagnetic interference (EMI) filter 140. The EMI filter 140 provides filtered input voltage to the current path 120, which flows to the current limiter 112. The current limiter 112 adjustably limits current flow to the current limiter 114, and the current limiter 114 is configured to selectably interrupt current flow along the current path 120 to a bulk storage module 142. The bulk storage module 142 stores electrical power that is provided to an inverter 144. In some embodiments, the bulk storage module 142 can be a capacitor or a capacitor bank. The inverter 144 provides power and control for the operation of an electrical motor or other power-consuming load.

In connection with the implementation shown in FIG. 1, a safety shutdown signal 150 indicates a request for a shutdown of current flow along the current path 120 to the motor or other load. For example parameters such as voltage, current, temperature, vibration, lubricant supply, emergency stop (e.g., panic button) status, and/or combinations of these and other appropriate measurements can be monitored at a monitoring system (not shown) to determine if a safety shutdown is needed. If so, the safety shutdown signal 150 can be provided to a trip drive 146. In some implementations, the safety shutdown signal 150 can indicate the need for a safety shutdown as a positive signal (e.g., presence of a voltage triggers the shutdown), as a negative signal (e.g., presence of a voltage indicates normal operation and absence of the voltage triggers the shutdown), or as any other appropriate analog or digital signal that can indicate a need for the shutdown and no need for the shutdown.

As shown in the implementation of FIG. 1, the trip drive module 146 converts the safety shutdown signal 150 to the input signals 130 and 132. For example, the safety shutdown signal 150 can be a digital signal, and the input signals 130 and/or 132 can be analog signals. In another example, the safety shutdown signal 150 can be a first voltage, and the input signals 130 and/or 132 can be provided at another voltage that is compatible with the inputs 113 and/or 117. In some implementations, the input signals 130 and 132 can be a common signal that is provided to both of the inputs 113 and 117.

As shown in the implementation of FIG. 1, an isolation barrier 147 electrically isolates the integrated safety shutdown and soft-start module 110 from components that provide the safety shutdown signal 150. In some embodiments, the isolation barrier can be a transformer included as part of the trip drive module 146. In some embodiments, the isolation barrier can be an optoisolator included as part of the trip drive module 146. In some embodiments, the isolation barrier 147 can be selected to satisfy requirements of a safety standard specification, such as the aforementioned IEC 61508 standard.

During normal, or "steady-state" operations, e.g., not at startup and no safety shutdown is requested, the input signals 130 and 132 cause the current limiters 112 and 114 to provide little to no current limiting along the current path 120. In such a configuration, the input voltage 122 and the currents associated with it are conducted to the bulk storage module 142 with substantially no interference from the integrated safety shutdown and soft-start module 110.

When a safety shutdown is requested, the safety shutdown signal 150 is provided to the trip drive module 146, which responds by providing the input signals 130 and 132 in states that cause the current limiters 112 and 114 to substantially block current flow along the current path 120. Even if one of the current limiters 112 and 114 were to fail to open, it is likely that the other will remain operational and halt the current flow. As such, the current limiters 112 and 114 provide a redundant and highly available current interruption capability. In some embodiments, the current limiters 112 and 114 can be selected and configured to satisfy the redundancy and high-availability requirements of a safety standard specification, such as the aforementioned IEC 61508 standard. In some embodiments, during a safety shutdown, the inverter 144 may drain the electrical power stored in the bulk storage module 142.

At startup, such as when the system 100 is first powered up or after the conditions that caused a prior safety shutdown to be cleared, the bulk storage module 142 may be substantially discharged. Upon application of the input voltage 122 and without the integrated safety shutdown and soft-start module 110 in place, large and potentially damaging inrush currents may be consumed by the bulk storage module 142. The integrated safety shutdown and soft-start module 110 limits these startup currents during a startup period having a predetermined length of time, such as 1 s, 5 s, 10 s, or appropriate multiples or fractions thereof. During the start of the startup period, the soft start module 115 provides a predetermined, limited current flow that is greater than zero, but less than the rated current carrying capacity of the current path 120 or components connected along the path 120. In some embodiments, the soft start module 115 may controllably increase current flow during the startup period. For example, the current limiter 112 may be configured to permit nearly zero current flow at the start of the startup period, and gradually increase the current flow in proportion to the duration of the startup period at the end of which the current flow will be substantially unimpeded by the current limiter 122. For another example, the soft start module 115 may vary the current flow based on the current demands of other components within, or outside of, the system 100.

In the example of system 100, the current limiters 112 and 114 are the only controllable current-limiting devices along the current path 120, and are used to provide both a highly-available safety shutdown function and a soft start function for the current path 120. As such, the integrated safety shutdown and soft-start module 110 is capable of providing both a highly-available safety shutdown function and a soft start function in an integrated package while using only the two current limiters 112 and 114.

Figure 2:
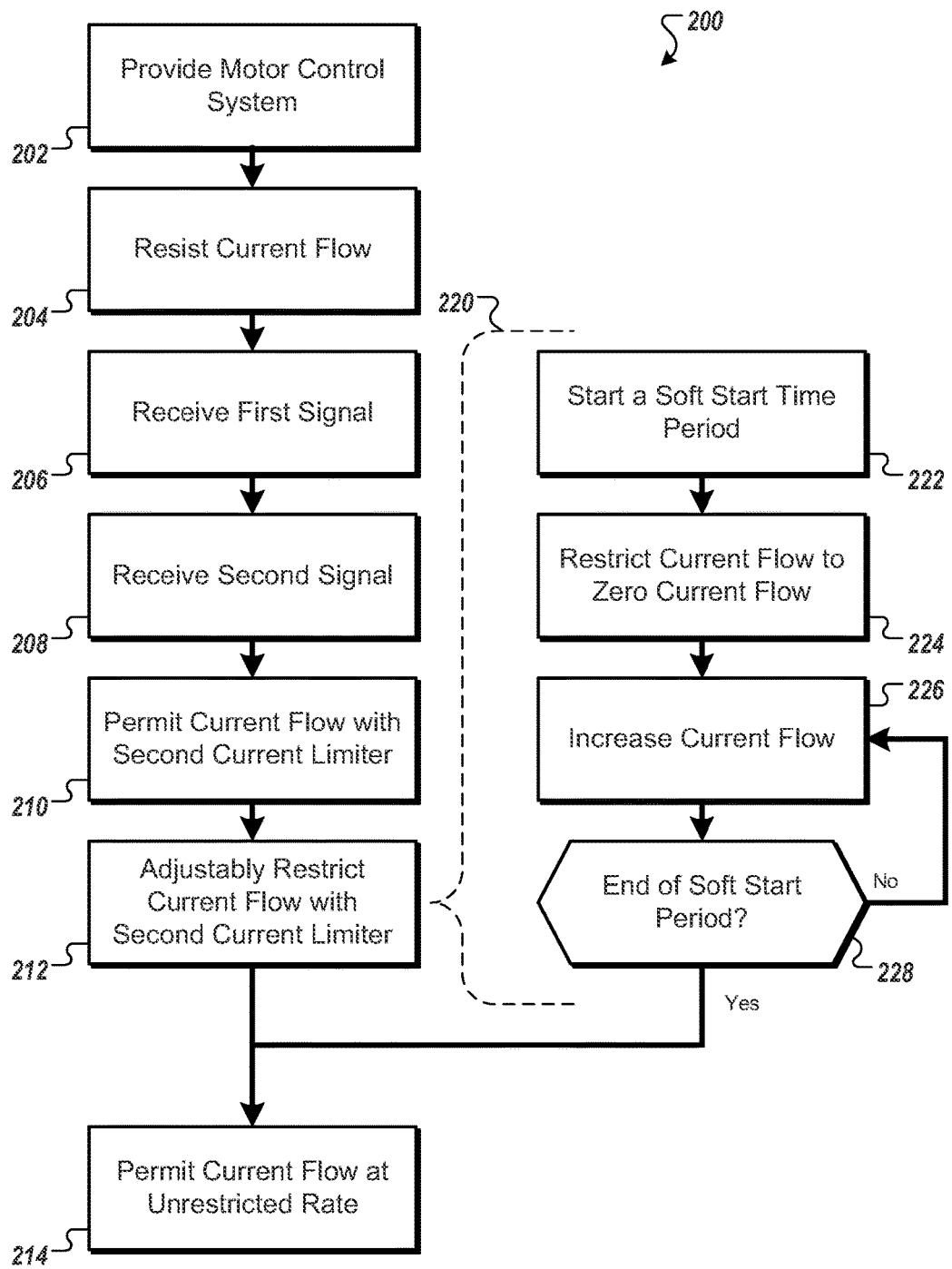
FIG. 2 is a flow diagram of an example process for providing integrated safety shutdown and soft-start operations.

FIG. 2 is a flow diagram of an example process 200 for providing integrated safety shutdown and soft-start operations. In some implementations, the process 200 can be performed by the example integrated safety shutdown and soft-start module 110 and the example system 100 of FIG. 1.

The process 200 begins when a motor control system is provided (202). The motor control system includes a current control assembly, such as the integrated safety shutdown and soft-start module 110, in an electrical current flow path, such as the current path 120. The current control assembly includes a first current limiter, such as the current limiter 112, in the electrical current flow path and including circuitry configured to adjustably restrict current flow along the electrical current flow path between an electrical input such as the input voltage 122 and a voltage storage assembly such as the bulk storage module 142, and a first input port such as the input port 113. The current control assembly also includes a second input port, such as the input port 117, and a second current limiter, such as the current limiter 114, in the electrical current flow path and arranged to interrupt the electrical current flow path. Current flow is resisted (204) by at least one of the current limiters. In some embodiments, the functions of the first and second current limiters may be performed by a single current limiter.

A first signal, such as the input signal 130, is received (206) at the first input port, such as input port 113. A second signal, such as the input signal 132, is received (208) at the second input port, such as input port 117. In response to the second signal, the second current limiter permits (210) current flow in the current flow path. For example, the current limiter 114 can permit current flow in response to the input signal 132.

In response to the first signal, such as input signal 130, the first current limiter, such as current limiter 112, adjustably restricts (212) current flow in the current flow path. For example, soft start module 115 can configure the current limiter 112 to restrict current flow to rate that is greater than zero flow and less than a substantially unimpeded current flow along the current path 120. In some embodiments, the current limiter 112 can provide the adjustable restriction during a predetermined startup period.

The current limiters then permit (214) current flow at a substantially unrestricted rate. For example, the soft start module 115 can control current limiter 112 to provide substantially zero restriction after the startup period has expired.

In some implementations, the process of adjustably restricting (212) current flow can be performed according to an optional sub-process 220. At the start of the sub-process 220, a soft start time period having a start time and a predetermined end time is started. For example, the inrush period may be determined to be the amount of time needed to charge the bulk storage module 142 to capacity, based on the capacity, the input voltage 122, and the restriction (e.g., impedance) provided by the current limiter 112. In some embodiments, the inrush period may be determined based on a timing relationship between the input signals 130 and 132. For example, there may be a delay between the input signal 130 and 132, in no particular order, and the inrush period may be made proportional to the delay.

At the start of the start time, the soft start module 115 configures the first current limiter to restrict (224) current flow to about zero flow. The soft start module 115 then configures the first current limiter to increase (226) current flow along the current path.

If it is determined (228) that the end of the soft start period has not been reached, then current flow is increased (226) again. In some implementations, a delay period may be allowed to expire before the determination (228) is tested again. If it is determined (228) that the end of the soft start period has been reached, then the first current limiter is configured to permit (214) current flow along the current flow path at a substantially unrestricted rate upon expiration of the soft start time period.

In some embodiments, the soft start period may be variable based on the charging state of the bulk storage module 142. For example, the current limiter 112 may be adjusted based on a differential voltage that exists between the input voltage 122 and the charging state of the bulk storage module 142. In such an example, the current limiter 112 may be highly restrictive when the voltage difference, and therefore the maximum current, are at their greatest, and limit inrush current to a predetermined level. As the bulk storage module 142 charges and the voltage difference decreases, the current limiter 112 may be adjusted to provide a proportionally reduced amount of restriction that limits current to the predetermined level. When the voltage difference is at or near zero, the inrush period may be determined as being over and the current limiter 112 can be configured to permit substantially zero restriction along the current path 120.

Although a few implementations have been described in detail above, other modifications are possible. For example, the logic flows do not require the particular order shown, or sequential order, to achieve desirable results. In addition, other steps may be provided, or steps may be eliminated, from described flows, and other components may be added to, or removed from, the described systems. Accordingly, other implementations are within the scope of the following claims.

What is claimed is:

1. A current control assembly comprising:
an electrical current flow path having a maximum current flow rate;
a first current limiter in the electrical current flow path, the first current limiter comprising circuitry configured to
(i) in response to receipt of a first state of the first signal at a first input port, begin a soft start time period, restrict current flow from the electrical input toward the electrical load along the electrical current flow path to a restricted rate greater than zero current flow and less than the maximum current flow rate for the duration of the soft start time period, and permit current flow along the electrical current flow path from the electrical input toward the electrical load along the electrical current flow path at an unrestricted rate upon expiration of the soft start time, and (ii) stop current flow from the electrical input toward the electrical load along the electrical current flow path in response to a second state of the first signal; and
a second current limiter in the electrical current flow path and in series electrical connection with the first current limiter such that current flows through both current limiters simultaneously, the second current limiter arranged to interrupt current flow from the electrical input toward the electrical load along the electrical current flow path in response to receipt of a second signal at a second input port.

2. The current control assembly of claim 1, wherein the restricted rate is a variable restricted flow rate ranging from about zero current flow at the start of the soft start time period to an unrestricted rate at the expiration of the soft start time.

3. The current control assembly of claim 1, wherein the second signal is the first signal.

4. The current control assembly of claim 1, wherein at least one of the first current limiter and the second current limiter comprise a current limiting component in the electrical current flow path and is selected from one of a field effect transistor, an insulated gate bipolar transistor, or a relay.

5. The current control assembly of claim 1, wherein the first current limiter comprises a field effect transistor and the second current limiter comprises a field effect transistor.

6. A motor control system with a soft-start capability, comprising:
an electrical current flow path having a maximum current flow rate;
an electrical input, configured to connect an input voltage to the electrical current flow path;
a voltage storage assembly in the electrical current flow path;

a current control assembly in the electrical current flow path, the current control assembly comprising:
  a first current limiter in the electrical current flow path, the first current limiter comprising circuitry configured to (i) in response to receipt of a first state of the first signal at a first input port, begin a soft start time period, restrict current flow from the electrical input toward the voltage storage assembly along the electrical current flow path to a restricted rate greater than zero current flow and less than the maximum current flow rate for the duration of the soft start time period, and permit current flow from the electrical input toward the voltage storage assembly along the electrical current flow path at an unrestricted rate upon expiration of the soft start time, and (ii) stop current flow from the electrical input toward the voltage storage assembly along the electrical current flow path in response to a second state of the first signal; and
  a second current limiter in the electrical current flow path and in series electrical connection with the first current limiter such that current flows through both current limiters simultaneously, the second current limiter arranged interrupt current flow from the electrical input toward the voltage storage assembly along the electrical current flow path in to receipt of a second signal at a second input port;
a motor controller arranged to receive electrical power from the voltage storage assembly; and
a motor configured to be controlled by the motor controller.

7. The system of claim 6, wherein
the restricted rate is a variable restricted flow rate ranging from about zero current flow at the start of the soft start time period to an unrestricted rate at the expiration of the soft start time period.

8. The system of claim 6, wherein the second signal is the first signal.

9. The system of claim 6, wherein at least one of the first current limiter and the second current limiter comprise a current limiting component in the electrical current flow path and is selected from one of a field effect transistor, an insulated gate bipolar transistor, or a relay.

10. The system of claim 6, wherein the first current limiter comprises a field effect transistor and the second current limiter comprises a field effect transistor.

11. A method for soft-starting an electrical current-consuming apparatus, the method comprising:
providing a motor control system comprising:
  a current control assembly in an electrical current flow path, the current control assembly comprising:
    a first current limiter in the electrical current flow path, the first current limiter comprising circuitry configured to (i) adjustably restrict current flow from an electrical input toward an electrical load along the electrical current flow path between an electrical input and a voltage storage assembly in response to a first state of a first signal and (ii) stop current flow from the electrical input toward the electrical load in the electrical current flow path in response to a second state of the first signal, and a first input port; and
    a second current limiter in the electrical current flow path and in series electrical connection with the first current limiter such that current flows through both current limiters simultaneously, the second current limiter arranged to interrupt current flow from the electrical input toward the electrical load in the electrical current flow path, and a second input port;
resisting, by the first current limiter and the second current limiter, current flow from the electrical input toward the electrical load in the electrical current flow path;
receiving the first state of a first signal at the first input port;
receiving a second signal at the second input port;
permitting, by the second current limiter in response to the second signal, current flow in the electrical current flow path;
adjustably restricting, by the first current limiter in response to the first state of the first signal, current flow from the electrical input toward the electrical load along the electrical current flow path to a flow rate less than the maximum current flow rate and greater than zero flow;
interrupting, by the first current limiter in response to receipt of the second state of the first signal at the first input port, current flow along the electrical current flow path;
beginning, in response to receipt of the first state of the first signal at the first input port, a soft start time period;
restricting, for the duration of the soft start time period, current flow from the electrical input toward the electrical load along the electrical current flow path to a restricted rate greater than zero current flow and less than the maximum current flow rate; and,
permitting, upon expiration of the soft start time, current flow from the electrical input toward the electrical load along the electrical current flow path at an unrestricted rate.

12. The method of claim 11,
wherein the soft start time period has a start time and an end time, and the method further comprises:
restricting, at the start time, current flow from the electrical input toward the electrical load along the electrical current flow path to about zero current flow; and,
increasing, during the soft start period, current flow from the electrical input toward the electrical load along the electrical current flow path from about zero current flow to an unrestricted rate at the end time.

13. The method of claim 11, wherein the second signal is the first signal.

14. The method of claim 11, wherein at least one of the first current limiter and the second current limiter comprise a current limiting component in the electrical current flow path and is selected from one of a field effect transistor, an insulated gate bipolar transistor, or a relay.

15. The method of claim 11, wherein the first current limiter comprises a field effect transistor and the second current limiter comprises a field effect transistor.

* * * * *